(12) United States Patent
Kohno et al.

(10) Patent No.: US 9,719,836 B2
(45) Date of Patent: Aug. 1, 2017

(54) AIR FLOW MEASURING DEVICE

(71) Applicant: DENSO CORPORATION, Kariya, Aichi-pref. (JP)

(72) Inventors: Yasushi Kohno, Obu (JP); Junzo Yamaguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 257 days.

(21) Appl. No.: 14/728,469

(22) Filed: Jun. 2, 2015

(65) Prior Publication Data

US 2015/0355005 A1 Dec. 10, 2015

(30) Foreign Application Priority Data

Jun. 4, 2014 (JP) .................. 2014-116182

(51) Int. Cl.
*G01F 1/684* (2006.01)
*G01F 25/00* (2006.01)
(Continued)

(52) U.S. Cl.
CPC ......... *G01F 25/0007* (2013.01); *F02D 41/18* (2013.01); *G01F 1/6842* (2013.01);
(Continued)

(58) Field of Classification Search
CPC ........ G01F 5/00; G01F 1/6842; G01F 1/6845; G01F 1/696; G01F 1/684; G01F 15/046;
(Continued)

(56) References Cited

U.S. PATENT DOCUMENTS 6,786,088 B2 * 9/2004 Matsumura ............... G01F 5/00
                                                            73/204.15
7,650,784 B2 * 1/2010 Watanabe ............. G01F 1/6842
                                                            73/204.26
(Continued)

FOREIGN PATENT DOCUMENTS

| JP | 5-164583 | 6/1993 |
| JP | 6-109506 | 4/1994 |
| JP | 11-258021 | 9/1999 |

*Primary Examiner* — Freddie Kirkland, III
(74) *Attorney, Agent, or Firm* — Nixon & Vanderhye PC

(57) ABSTRACT

A high-temperature resistance is disposed in an internal passage and has its energization controlled based on an intake-air flow rate in the passage to increase/decrease a heat generation amount. A first low-temperature resistance constitutes a bridge circuit which has its energization state changed according to the heat generation amount of the high-temperature resistance. The first low-temperature resistance varies its resistance value according to intake-air temperature. A second low-temperature resistance is an element, which is not incorporated into the bridge circuit and varies its resistance value according to intake-air temperature to increase/decrease an energization amount. The second low-temperature resistance is provided on a substrate. Another bridge circuit produces an intake air amount detection signal using an electrical signal generated by operation of the high-temperature resistance and the first low-temperature resistance. A digital circuit uses an electrical signal produced by the second low-temperature resistance as an intake temperature detection signal.

8 Claims, 8 Drawing Sheets

(51) Int. Cl.
*F02D 41/18* (2006.01)
*G01F 1/696* (2006.01)
*G01F 1/692* (2006.01)
*G01F 1/699* (2006.01)
*G01F 5/00* (2006.01)
*G01F 15/04* (2006.01)

(52) U.S. Cl.
CPC ............ *G01F 1/6845* (2013.01); *G01F 1/692* (2013.01); *G01F 1/696* (2013.01); *G01F 1/699* (2013.01); *G01F 5/00* (2013.01); *G01F 15/046* (2013.01); *F02D 41/187* (2013.01); *F02D 2200/0414* (2013.01)

(58) Field of Classification Search
CPC ...... G01F 1/692; G01F 1/699; G01F 25/0007; F02D 2200/0414; F02D 41/18; F02D 41/187
See application file for complete search history.

(56) References Cited

U.S. PATENT DOCUMENTS

| | | | |
|---|---|---|---|
| 8,069,718 B2 * | 12/2011 | Nakano | G01F 1/6845 73/204.26 |
| 8,203,102 B2 * | 6/2012 | Nakano | G01F 1/684 219/483 |
| 8,336,376 B2 * | 12/2012 | Nakano | G01F 1/6845 73/204.15 |
| 8,468,883 B2 * | 6/2013 | Sakuma | G01F 1/6842 73/204.26 |
| 8,739,619 B2 * | 6/2014 | Ooga | G01K 13/02 73/202.5 |
| 8,779,337 B2 * | 7/2014 | Nakano | G01F 1/684 219/483 |
| 8,899,103 B2 * | 12/2014 | Ariyoshi | G01F 5/00 73/114.34 |
| 9,383,240 B2 * | 7/2016 | Kohno | G01F 1/6845 |
| 2003/0154781 A1 * | 8/2003 | Matsumura | G01F 5/00 73/204.15 |
| 2006/0037390 A1 | 2/2006 | Nakano et al. | |
| 2007/0089503 A1 | 4/2007 | Nakano et al. | |
| 2013/0028288 A1 * | 1/2013 | Ooga | G01K 13/02 374/142 |
| 2016/0003686 A1 * | 1/2016 | Matsumoto | G01K 7/25 73/1.34 |

* cited by examiner

FLOW DIRECTION OF INTAKE AIR IN INTAKE PASSAGE

AIR FLOW MEASURING DEVICE

CROSS REFERENCE TO RELATED APPLICATION

This application is based on Japanese Patent Application No. 2014-116182 filed on Jun. 4, 2014, the disclosure of which is incorporated herein by reference.

TECHNICAL FIELD

The present disclosure relates to an air flow measuring device that produces a signal indicating a flow rate of air.

BACKGROUND

For example, for an air flow measuring device that produces a signal (which may be hereinafter referred to as an intake air amount detection signal) indicating a flow rate of intake air (which may be hereinafter referred to as an intake air amount) drawn into an internal combustion engine, there is conventionally known a device that employs a thermal-type detection method whereby the intake air amount detection signal is produced by use of heat transfer between the device and air. The air flow measuring device includes a housing and an intake air amount sensor described as follows. Specifically, the housing is disposed to project into an intake passage leading to the engine, and defines an internal passage which guides in a part of intake air flowing through the intake passage and through which the intake air passes. The intake air amount sensor projects into the internal passage, and produces the intake air amount detection signal by the heat transfer between the sensor and the intake air passing through the internal passage. The intake air amount sensor includes a high-temperature resistance and a low-temperature resistance described as follows.

Specifically, the high-temperature resistance has its energization controlled in accordance with the intake air amount in the internal passage to increase or decrease its heat generation amount. The low-temperature resistance is disposed, for example, on an upstream side of the high-temperature resistance, and varies its resistance value according to the temperature of intake air (which may be hereinafter referred to as intake temperature) to increase or decrease the energizing amount without the effect of the heat generation of the high-temperature resistance. The high-temperature resistance and the low-temperature resistance constitute a bridge circuit together with a fixed resistance whose resistance value is fixed. This bridge circuit is controlled to produce the intake air amount detection signal based on an electric potential at its predetermined region, for example (see, e.g., JP2003-240620A).

There is a demand on the air flow measuring device for the detection of the intake temperature in addition to the intake air amount. Accordingly, the air flow measuring device in JP2003-240620A detects an applied voltage (V1) to the bridge circuit and a connection point voltage (V3) of the low-temperature resistance (22) and the fixed resistance (24) to enable the detection of the intake temperature by means of the low-temperature resistance (22) (reference numerals in the parentheses are in agreement with the descriptions in JP2003-240620A). However, according to the air flow measuring device in JP2003-240620A, after detecting both the voltages (V1, V3), calculation needs to be further carried out using the voltages (V1, V3). As a result, the circuit configuration and arithmetic processing for detecting the intake temperature are made cumbersome and complicated.

Consequently, separately from the low-temperature resistance included in the bridge circuit, there is proposed such a configuration that a thermistor with a lead wire, for example, is disposed outside the housing as an intake temperature sensor to directly detect the intake temperature in the intake passage (see, e.g., JP2013-029387A). Accordingly, the intake temperature can be detected by detecting one electrical signal, and thus the complication of the circuit configuration and arithmetic processing for detecting the intake temperature can be eliminated. Nevertheless, various measures needs to taken to stably hold the intake temperature sensor outside the housing, or to stabilize the conductive joining between the lead wire and the terminal, so that this configuration is made structurally cumbersome and complicated.

SUMMARY

The present disclosure addresses at least one of the above issues. Thus, it is an objective of the present disclosure to, in an air flow measuring device, decrease complication of a circuit configuration and arithmetic processing and structural complication related to detection of intake temperature.

To achieve the objective of the present disclosure, there is provided an air flow measuring device for producing an intake air amount detection signal and an intake temperature detection signal which indicate a flow rate and a temperature of intake air drawn into an internal combustion engine, respectively. The air flow measuring device includes a housing, a high-temperature resistance, a first low-temperature resistance, a second low-temperature resistance, a predetermined substrate, another bridge circuit, and a digital circuit. The housing projects into an intake passage through which the intake air flows, and includes an internal passage which takes in a part of the intake air flowing through the intake passage and through which the part of the intake air passes. The high-temperature resistance is disposed in the internal passage and has its energization controlled in accordance with the flow rate of intake air flowing through the internal passage to increase or decrease an amount of heat generated. The first low-temperature resistance is an element constituting a bridge circuit which has its energization state changed according to the amount of heat generated by the high-temperature resistance. The first low-temperature resistance varies its resistance value according to the temperature of intake air. The second low-temperature resistance is an element, which is not incorporated into the bridge circuit and varies its resistance value according to the temperature of intake air to increase or decrease an amount of energization. The second low-temperature resistance is provided as a semiconducting or metallic film on the predetermined substrate. The another bridge circuit produces the intake air amount detection signal by use of an electrical signal generated by operation of the high-temperature resistance and the first low-temperature resistance. The digital circuit uses an electrical signal produced by the second low-temperature resistance as the intake temperature detection signal.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
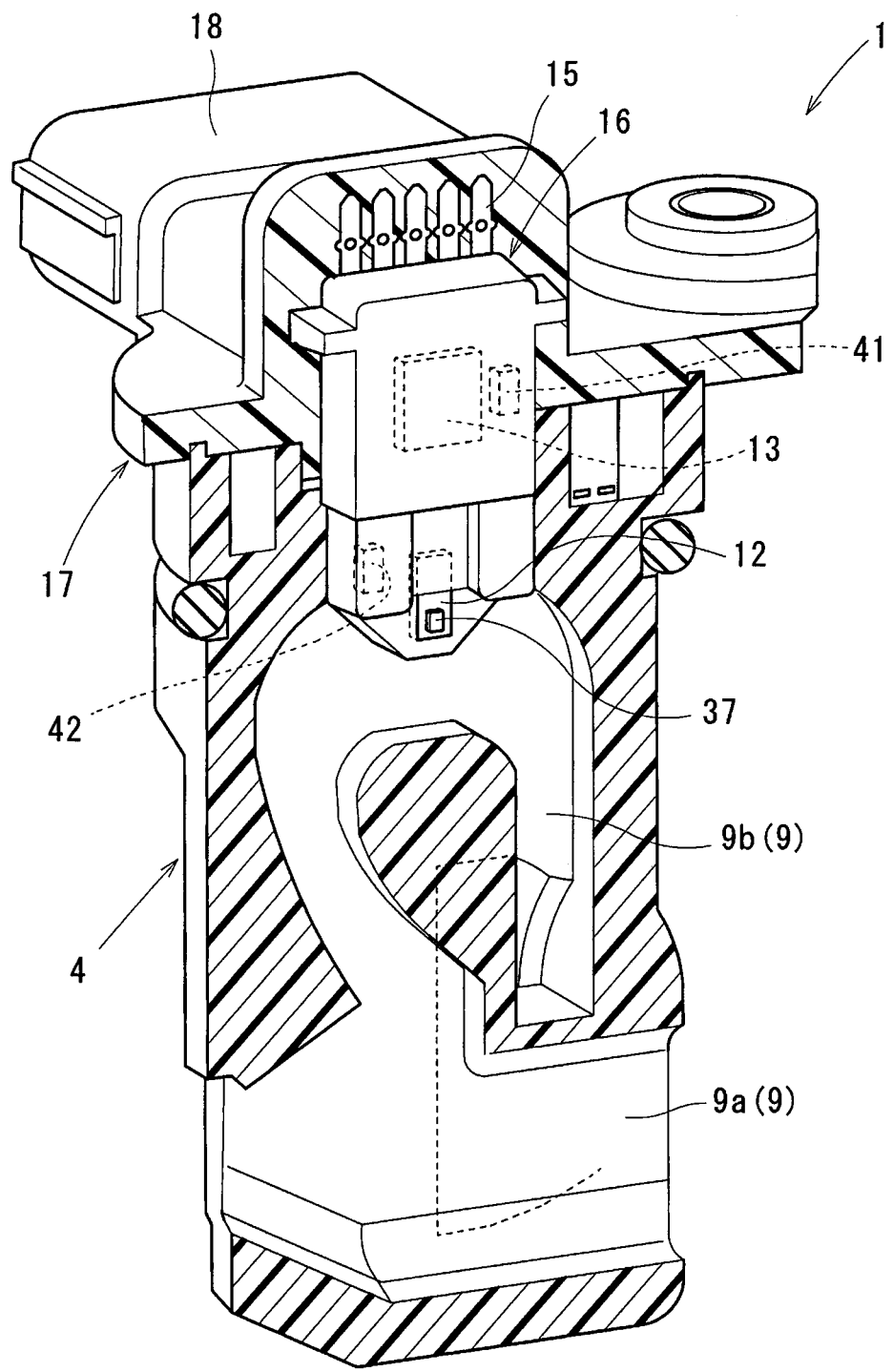
FIG. 1 is a sectional perspective view illustrating an interior portion of an air flow measuring device in accordance with a first embodiment.
Figure 2:
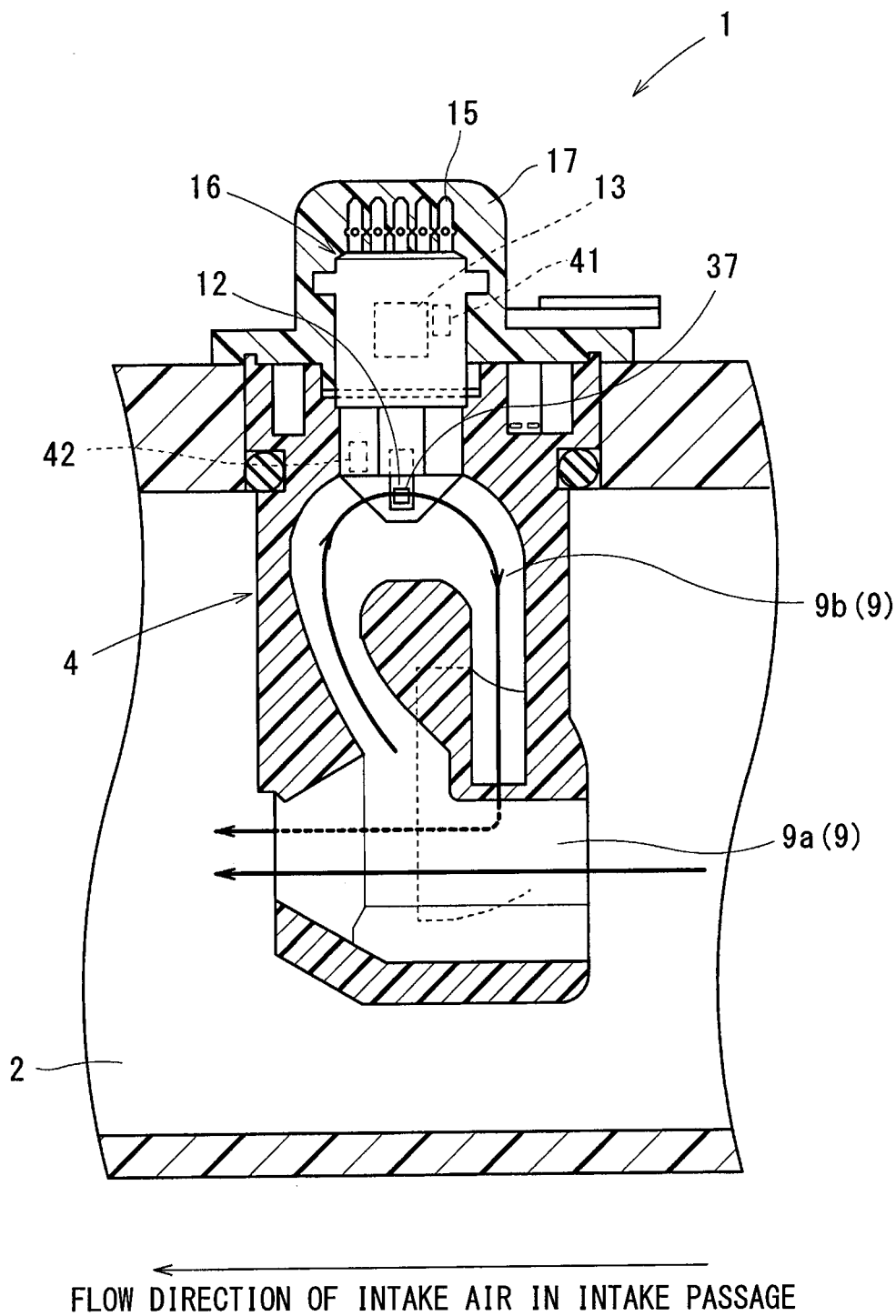
FIG. 2 is a sectional view illustrating the interior portion of the air flow measuring device of the first embodiment.

Embodiments will be described below. Each embodiment illustrates one specific example, and it goes without saying that the present disclosure is not limited to the embodiments.

First Embodiment

A configuration of an air flow measuring device 1 in a first embodiment will be described with reference to FIGS. 1 to 6. The air flow measuring device 1 employs a thermal-type detection method whereby to produce a signal in accordance with a flow rate of air by use of heat transfer between the device and air. The air flow measuring device 1 is disposed to project into an intake passage 2 leading to an internal combustion engine, for example, for measuring a flow rate of intake air (intake air amount) drawn into the engine (not shown) (see FIG. 1), and produces a signal in accordance with the intake air amount (intake air amount detection signal) Q. The intake air amount detection signal Q is outputted to an electronic control unit (ECU) 3 which is provided separately from the air flow measuring device 1 to be used for control of the engine operation.

The air flow measuring device 1 includes a housing 4, a high-temperature resistance 5, a first low-temperature resistance 6, and a processing part 7, which will be described hereinafter. The housing 4 projects into the intake passage 2 and defines an internal passage 9 which guides in a part of intake air flowing in the intake passage 2 and through which the intake air passes. The internal passage 9 mainly includes a first flow passage 9a that makes the guided-in intake air flow straight approximately in the same direction as the flow in the intake passage 2 and that discharges the intake air, and a second flow passage 9b that separates a part of the intake air flow from the first flow passage 9a and guides the intake air around to discharge the intake air (see FIGS. 1 and 2). The housing 4 is, for example, a resin molded component that is provided by injection molding from molten resin.

The high-temperature resistance 5 is disposed in the second flow passage 9b, and has its energization controlled in accordance with the intake air amount in the second flow passage 9b to increase or decrease its heat generation amount. The first low-temperature resistance 6 is an element that constitutes a bridge circuit 10 (which will be described in greater detail hereinafter; see, e.g., FIG. 6) in which an energized state changes depending on the amount of heat generation of the high-temperature resistance 5, and varies its resistance value according to the temperature of intake air (intake temperature). The processing part 7 performs processing for producing the intake air amount detection signal Q, and converts the intake air amount detection signal Q into an output signal to be outputted to the ECU 3.

The high-temperature resistance 5 and the first low-temperature resistance 6 are provided as semiconducting films on a substrate 12, and the processing part 7 is mainly provided on a substrate 13. The elements provided on the substrate 12 such as the high-temperature resistance 5 and the first low-temperature resistance 6, and the element provided on the substrate 13 to constitute the processing part 7 are connected together by bonding wires (not shown) so as to form bridge circuits 10, 14 (see, e.g., FIG. 6) The substrates 12, 13 are integrated by resin together with a predetermined terminal 15 to constitute one assembly 16, and the assembly 16 is attached to the housing 4 by press-fitting or the like. By injection-molding the integrated object of the housing 4 and the assembly 16 in molten resin, a secondary formation part 17 is provided. A connector 18 is formed when the secondary formation part 17 is provided.

The bridge circuit 10 is used for control of the heat generation of the high-temperature resistance 5, and is configured to include, for example, a fixed resistance 20, an indirect heat resistance 21, a comparator 22, and a switching element 23 which will be described hereinafter, in addition to the high-temperature resistance 5 and the first low-temperature resistance 6 (see, e.g., FIGS. 3, 4 and 6). The fixed resistance 20 has its resistance value fixed to be almost constant regardless of temperature. The fixed resistance 20 is connected in series with the first low-temperature resistance 6, and a combined resistance 25 of the fixed resistance 20 and the first low-temperature resistance 6 is connected in parallel with the high-temperature resistance 5. In the combined resistance 25, one side of the fixed resistance 20 is pulled up, and the other side of the first low-temperature resistance 6 is grounded and pulled down.

The indirect heat resistance 21 is provided close to the high-temperature resistance 5 to be thermally influenced by the high-temperature resistance 5 thereby to have a predetermined temperature correlation with the high-temperature resistance 5 (see FIG. 4), and has its resistance value changed according to the temperature. The indirect heat resistance 21 is parallely-connected to the high-temperature resistance 5 and the combined resistance 25. One side of the indirect heat resistance 21 is pulled up, and the other side of the indirect heat resistance 21 is grounded and pulled down. The fixed resistance 20 and the indirect heat resistance 21 are provided as semiconducting films on the substrate 12.

The switching element 23 is turned on when a signal outputted from the comparator 22 is inputted into the switching element 23. The switching element 23 is connected such that power can be fed from a power source 26 to the high-temperature resistance 5 by ON operation of the switching element 23 itself (see FIG. 6). One side of the high-temperature resistance 5 is connected to an output side of the switching element 23, and the other side of the high-temperature resistance 5 is grounded and pulled down.

The comparator 22 makes a comparison between an electric potential of one side of the indirect heat resistance 21 and an electric potential of a wire connecting the first low-temperature resistance 6 and the fixed resistance 20 in the combined resistance 25 (i.e., electric potential on one side of the first low-temperature resistance 6 and on the other side of the fixed resistance 20), and outputs a signal in accordance with the comparison result to the switching element 23. The comparator 22 and the switching element 23 are provided on the substrate 13 to constitute the processing part 7.

As a result of the above-described configuration, the bridge circuit 10 has its energized state changed so that a temperature difference between the first low-temperature resistance 6 and the indirect heat resistance 21 becomes generally constant. Specifically, when the temperature of the indirect heat resistance 21 decreases or increases due to increase or decrease of the intake air amount, the heat generation amount of the high-temperature resistance 5 increases or decreases, so that the temperature difference between the first low-temperature resistance 6 and the indirect heat resistance 21 is maintained to be nearly constant.

The bridge circuit 14 produces the intake air amount detection signal Q through the use of the heat generation of the high-temperature resistance 5, and is configured to include upstream temperature measurement resistances 28A, 28B, downstream temperature measurement resistances 29A, 29B, and a comparator 30 which will be described hereinafter (see FIG. 6). The upstream temperature measurement resistances 28A, 28B are arranged on an upstream side of the high-temperature resistance 5 in the second flow passage 9b (see, e.g., FIG. 4), and are thermally influenced by the high-temperature resistance 5 to have their temperature changed and to have their resistance values changed according to the temperature. The downstream temperature measurement resistances 29A, 29B are arranged on a downstream side of the high-temperature resistance 5 in the second flow passage 9b (see, e.g., FIG. 4), and are thermally influenced by the high-temperature resistance 5 to have their temperature changed and to have their resistance values changed according to the temperature.

Figure 6:
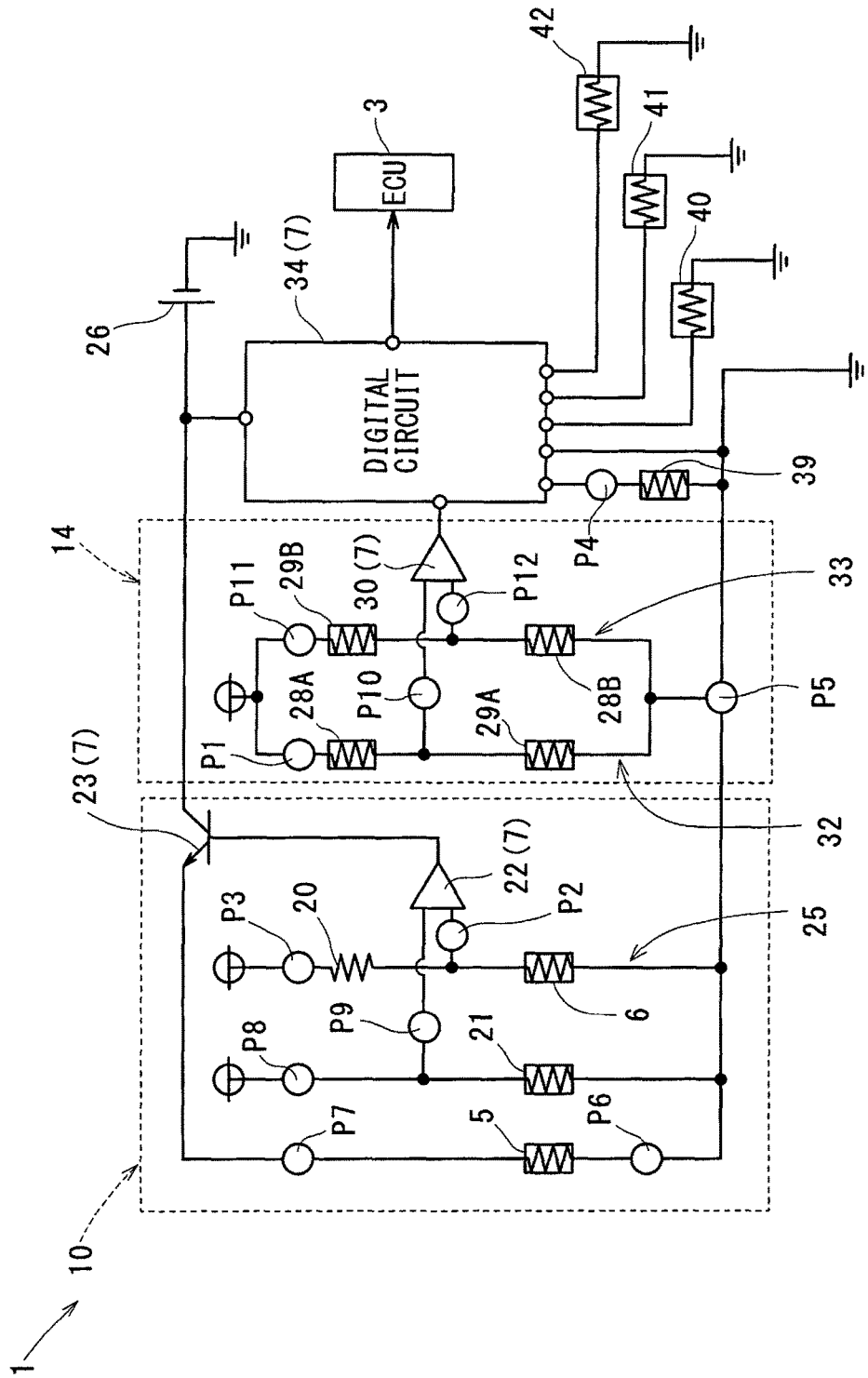
FIG. 6 is a circuit diagram illustrating the air flow measuring device of the first embodiment.

The upstream temperature measurement resistance 28A and the downstream temperature measurement resistance 29A are serially connected together, and the downstream temperature measurement resistance 29B and the upstream temperature measurement resistance 28B are serially connected together so as to constitute combined resistances 32, 33 respectively (see, e.g., FIG. 6). The combined resistances 32, 33 are connected in parallel with each other. One side of the combined resistances 32, 33 (i.e., one side of the upstream temperature measurement resistance 28A and one side of the downstream temperature measurement resistance 29B) is pulled up. The other side of the combined resistances 32, 33 (i.e., the other side of the downstream temperature measurement resistance 29A and the other side of the upstream temperature measurement resistance 28B) is grounded and pulled down. The upstream temperature measurement resistances 28A, 28B and the downstream temperature measurement resistances 29A, 29B are provided as semiconducting films on the substrate 12.

The comparator 30 makes a comparison between an electric potential of a connecting part between the upstream temperature measurement resistance 28A and the downstream temperature measurement resistance 29A in the combined resistance 32, and an electric potential of a connecting part between the downstream temperature measurement resistance 29B and the upstream temperature measurement resistance 28B in the combined resistance 33, and outputs a signal in accordance with the comparison result. The comparator 30 is provided on the substrate 13 to constitute the processing part 7.

As a result of the above-described configuration, the bridge circuit 14 outputs a signal in accordance with temperature difference ΔT between the upstream temperature measurement resistances 28A, 28B and the downstream temperature measurement resistances 29A, 29B. The temperature difference ΔT varies according to the intake air amount in the second flow passage 9b. Specifically, when a temperature distribution is considered with respect to a flow direction from the upstream side to the downstream side of the high-temperature resistance 5, a high-temperature range that is significantly thermally-influenced by the high-temperature resistance 5 is more lopsidedly inclined toward the downstream side as the intake air amount becomes larger, thereby making greater the temperature difference ΔT. For this reason, the signal outputted by the bridge circuit 14 is a signal in accordance with the intake air amount for use as the intake air amount detection signal Q.

Figure 4:
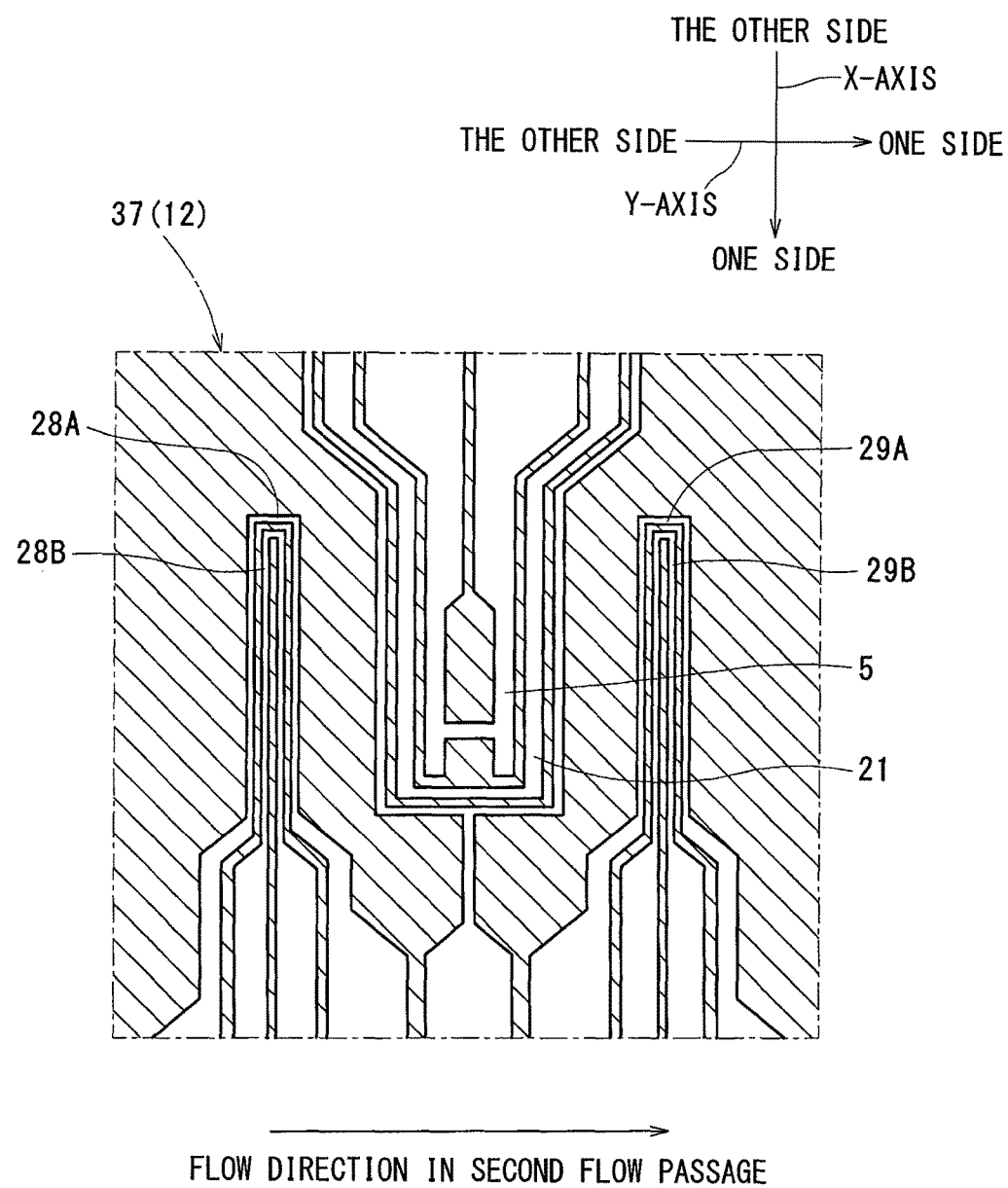
FIG. 4 is a partially enlarged view of FIG. 3 illustrating the element for intake air amount detection in the air flow measuring device, with its hatched parts serving as the non-wiring part according to the first embodiment.
Figure 5:
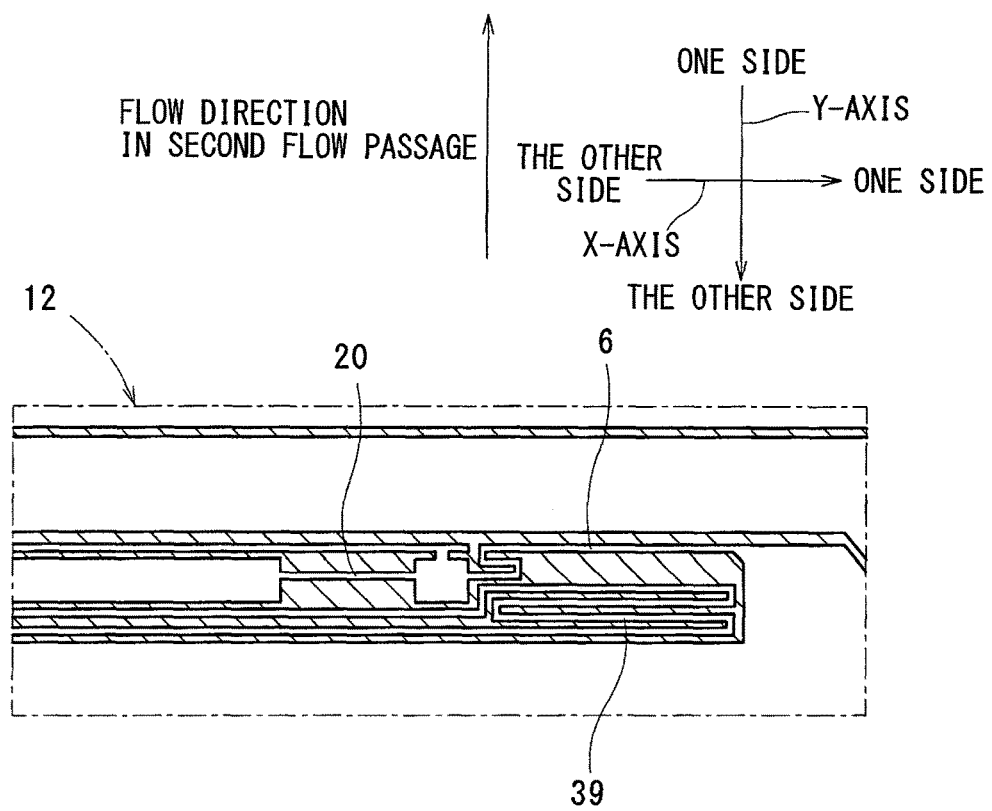
FIG. 5 is a partially enlarged view of FIG. 3 illustrating the element for intake temperature detection in the air flow measuring device with its hatched parts serving as the non-wiring part according to the first embodiment.

The intake air amount detection signal Q is outputted to a digital circuit 34 from the bridge circuit 14, and is A/D converted at an A/D conversion part 35 (see FIG. 7) of the digital circuit 34 to be outputted to the ECU 3 as a digital signal. The digital circuit 34 is provided on the substrate 13 to constitute the processing part 7. The arrangement of the various resistance elements on the substrate 12 will be described in reference to FIGS. 3 to 5. The substrate 12 is a rectangular plate-shaped body made from a semiconductor (in the following description, the longitudinal direction of the substrate 12 is referred to as an X-axis direction, and a shorter direction of the substrate 12 is referred to as a Y-axis direction. A surface viewed in FIGS. 3 to 5 is referred to as a front surface, and a surface on its opposite side is referred to as a rear surface).

A thin film range 37 having a generally square shape is provided on the substrate 12. The thin film range 37 is provided on one side of the central part in the X-axis direction. A front surface of the thin film range 37 is coplanar with the front surface of the substrate 12, and a rear surface of the thin film range 37 is recessed from the rear surface of the substrate 12. The high-temperature resistance 5, the indirect heat resistance 21, the upstream temperature measurement resistances 28A, 28B, and the downstream temperature measurement resistances 29A, 29B are provided on the front surface of the thin film range 37. The first low-temperature resistance 6 and the fixed resistance 20 are provided on the front surface of the substrate 12 other than the thin film range 37.

Electrode pads P1 to P12, to which the bonding wires are joined, are provided near the other end of the front surface of the substrate 12 in the X-axis direction. A large portion of the front surface of the substrate 12 except the thin film range 37 is taken up with the wires constituting the bridge circuits 10, 14. The positions of the electrode pads P1 to P12 in the bridge circuits 10, 14 in terms of electric potential are illustrated in FIG. 6.

On the front surface of the thin film range 37, the high-temperature resistance 5 is provided, for example, such that a longitudinal direction of the high-temperature resistance 5 accords with the X-axis direction and is perpendicular to the Y-axis direction. The indirect heat resistance 21 is provided, for example, to surround the high-temperature resistance 5. The upstream temperature measurement resistances 28A, 28B are provided on the other side of the high-temperature resistance 5 and the indirect heat resistance 21 in the Y-axis direction. The downstream temperature measurement resistances 29A, 29B are provided on one side of the high-temperature resistance 5 and the indirect heat resistance 21 in the Y-axis direction.

The upstream temperature measurement resistance 28A is provided to surround the upstream temperature measurement resistance 29B. The downstream temperature measurement resistance 29A is provided to surround the downstream temperature measurement resistance 29B. The first low-temperature resistance 6 and the fixed resistance 20 are provided on one side of the central part in the X-axis direction on the front surface of the substrate 12 except the thin film range 37.

The assembly 16 is attached to the housing 4 such that the resistance elements in the thin film range 37 and the first low-temperature resistance 6 project into the second flow passage 9b and such that one side and the other side of the substrate 12 in the X-axis direction accord respectively with a downstream side and an upstream side in a flow direction in the second flow passage 9b. In the assembly 16, the substrate 13 is located on the other side of the substrate 12 in the Y-axis direction. Accordingly, the resistance elements in the thin film range 37 (the high-temperature resistance 5, the indirect heat resistance 21, the upstream temperature measurement resistances 28A, 28B, and the downstream temperature measurement resistances 29A, 29B) are thermally insulated from the substrate 12. The first low-temperature resistance 6 is not thermally influenced by the high-temperature resistance 5 but is thermally influenced by a flow of intake air that is not heated by the high-temperature resistance 5.

As its characteristic configuration, the air flow measuring device 1 includes a second low-temperature resistance 39, a first auxiliary resistance 40, a second auxiliary resistance 41, and a third auxiliary resistance 42 which will be described hereinafter (see FIGS. 1, 2, 5 to 7), and produces a signal (intake temperature detection signal) T in accordance with the intake temperature.

Figure 3:
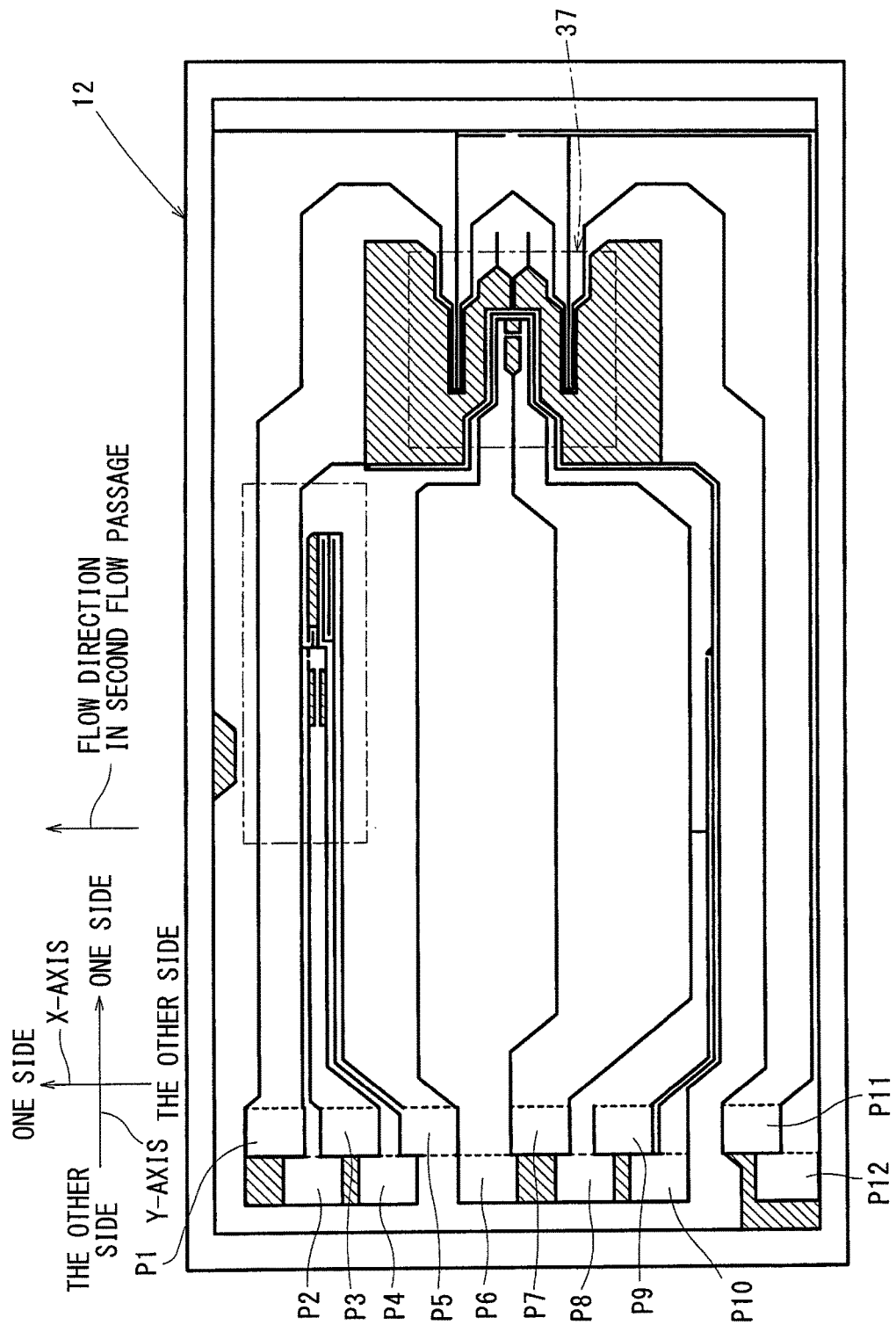
FIG. 3 is a plan view illustrating a substrate that includes elements for intake air amount detection and for intake temperature detection in the air flow measuring device, with its hatched parts serving as a non-wiring part according to the first embodiment.

The second low-temperature resistance 39 is an element that is not incorporated into the bridge circuits 10, 14 (see FIG. 6) and that varies its resistance value according to the intake temperature to increase or decrease the energizing amount, and is provided on the substrate 12 as a semiconducting film (see FIGS. 3 and 5). Specifically, the second low-temperature resistance 39 is provided close to the first low-temperature resistance 6 and the fixed resistance 20 on the front surface of the substrate 12 except the thin film range 37, and projects into the second flow passage 9b. Similar to the first low-temperature resistance 6, the second low-temperature resistance 39 is not thermally influenced by the high-temperature resistance 5 but is thermally influenced by the flow of intake air that is not heated by the high-temperature resistance 5.

Figure 7:
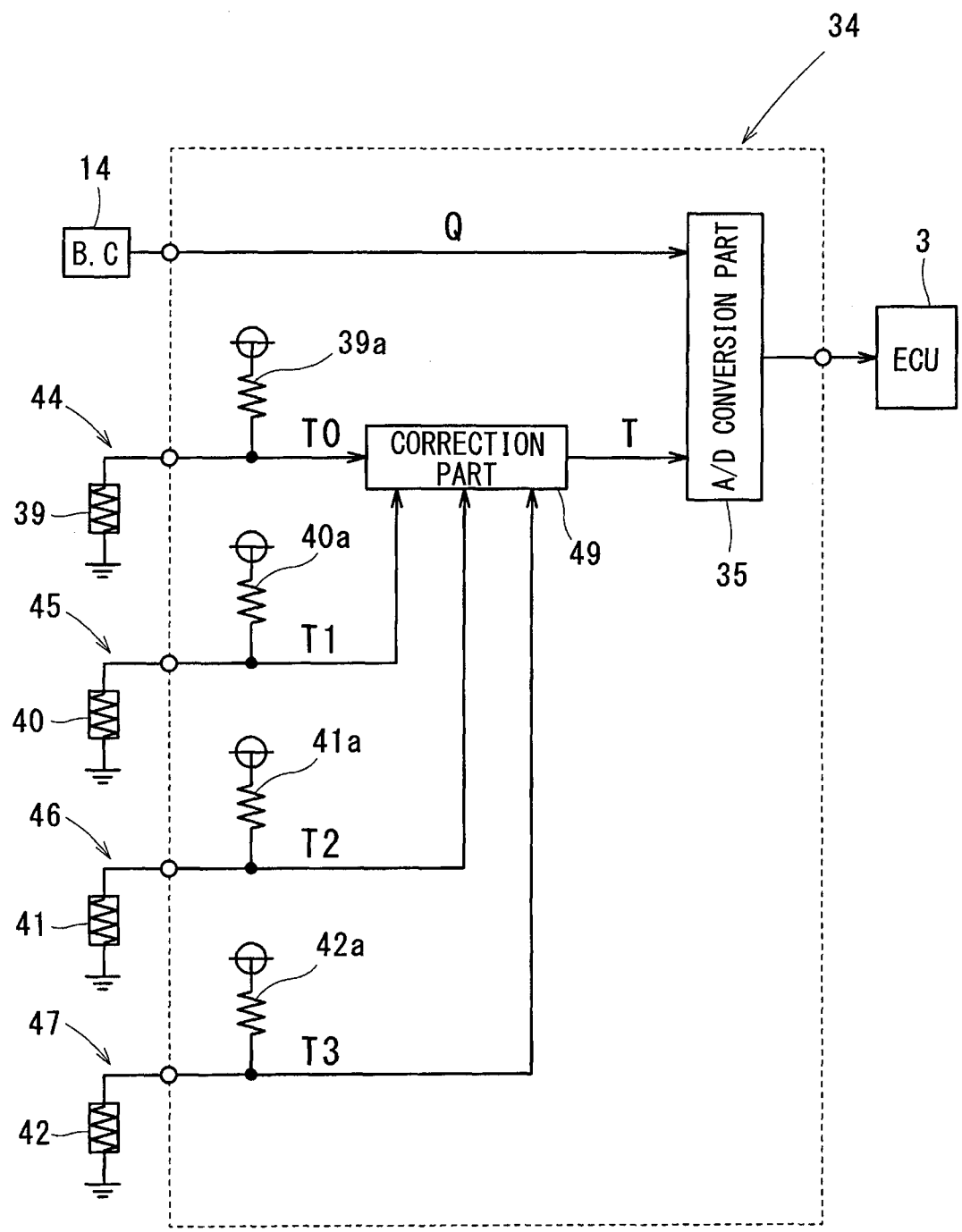
FIG. 7 is a block diagram illustrating a main feature of the air flow measuring device of the first embodiment.

The second low-temperature resistance 39 is connected to the digital circuit 34, and constitutes a combined resistance 44 together with a fixed resistance 39a which is provided for the digital circuit 34 (see FIG. 7). The fixed resistance 39a-side of the combined resistance 44 is pulled up, and the second low-temperature resistance 39-side of the combined resistance 44 is grounded and pulled down. An electric potential of a connecting part between the fixed resistance 39a and the second low-temperature resistance 39 is outputted as an electrical signal T0 produced by the second low-temperature resistance 39. As a result of the above-described configuration, the electrical signal T0 from the second low-temperature resistance 39 is used as a pre-correction signal of the intake temperature detection signal T in the digital circuit 34, as will be described hereinafter.

The first auxiliary resistance 40 is provided on the substrate 13, and is influenced by heat generation of the processing part 7 to vary its resistance value, thereby increasing or decreasing the energizing amount. The first auxiliary resistance 40 is connected to the digital circuit 34, and constitutes a combined resistance 45 together with a fixed resistance 40a provided for the digital circuit 34 (see FIG. 7). The fixed resistance 40a-side of the combined resistance 45 is pulled up, and the first auxiliary resistance 40-side of the combined resistance 45 is grounded and pulled down. An electric potential of a connecting part between the fixed resistance 40a and the first auxiliary resistance 40 is outputted as an electrical signal T1 produced by the first auxiliary resistance 40.

Due to heat transfer from a part of the air flow measuring device 1 other than the high-temperature resistance 5 and the processing part 7, the second auxiliary resistance 41 varies its resistance value, thereby increasing or decreasing the energizing amount. Specifically, the second auxiliary resistance 41 is not thermally influenced by the substrates 12, 13 in the assembly 16, and is attached at a position that is thermally influenced by the housing 4 and the secondary formation part 17 (see FIGS. 1 and 2).

The second auxiliary resistance 41 is connected to the digital circuit 34, and constitutes a combined resistance 46 together with a fixed resistance 41a provided for the digital circuit 34 (see FIG. 7). The fixed resistance 41a-side of the combined resistance 46 is pulled up, and the second auxiliary resistance 41-side of the combined resistance 46 is grounded and pulled down. An electric potential of a connecting part between the fixed resistance 41a and the second auxiliary resistance 41 is outputted as an electrical signal T2 produced by the second auxiliary resistance 41.

The third auxiliary resistance 42 varies its resistance value, thereby increasing or decreasing the energizing amount due to heat transfer from the intake air heated by the high-temperature resistance 5 in the internal passage 9. Specifically, the third auxiliary resistance 42 is attached at a position that is close to the second flow passage 9b on an upstream side of the substrate 12 in the assembly 16 (see FIGS. 1 and 2), and is thermally influenced by the intake air heated by the high-temperature resistance 5.

The third auxiliary resistance 42 is connected to the digital circuit 34, and constitutes a combined resistance 47 together with a fixed resistance 42a provided for the digital circuit 34 (see FIG. 7). The fixed resistance 42a-side of the combined resistance 47 is pulled up, and the third auxiliary resistance 42-side of the combined resistance 47 is grounded and pulled down. An electric potential of a connecting part between the fixed resistance 42a and the third auxiliary resistance 42 is outputted as an electrical signal T3 produced by the third auxiliary resistance 42.

In the air flow measuring device 1 of the first embodiment, the digital circuit 34 includes a correction part 49 that corrects the intake temperature detection signal T (electrical signal T0) by the electrical signals from the first to third auxiliary resistances 40 to 42. The correction part 49 corrects the intake temperature detection signal T, for example, based on the following mathematical expression 1.

$$T = T0 + a \cdot T1 + b \cdot T2 + c \cdot T3 + d \qquad \text{[Mathematical expression 1]}$$

The corrected intake temperature detection signal T is A/D converted at the A/D conversion part 35 and is outputted to the ECU 3 as a digital signal. The intake temperature detection signal T and the intake air amount detection signal Q which have been digitized are outputted to the ECU 3 sequentially as serial signals.

Effects of the first embodiment will be described below. The air flow measuring device 1 of the first embodiment produces the intake air amount detection signal Q by using the electrical signal produced by the operations of the high-temperature resistance 5 and the first low-temperature resistance 6, and uses the electrical signal T0 produced by the second low-temperature resistance 39 as a pre-correction intake temperature detection signal T. To be less thermally influenced by the high-temperature resistance 5, the second low-temperature resistance 39 is provided as a semiconducting film at a part of the substrate 12 other than the thin film range 37, and is not incorporated into the bridge circuits 10, 14. The second low-temperature resistance 39 varies its resistance value according to the intake temperature, thereby increasing or decreasing the energizing amount.

Accordingly, the intake temperature can be detected through the detection of the electrical signal T0, and thus the complication of the circuit configuration and arithmetic processing related to the intake temperature detection can be reduced. Moreover, by providing the second low-temperature resistance 39 as a semiconducting film on the substrate 12, the structural complication can be decreased. Thus, in the air flow measuring device 1, the complication of the circuit configuration and arithmetic processing and the structural complication related to the detection of intake temperature can be reduced.

Furthermore, the first auxiliary resistance 40 is influenced by heat generation of the processing part 7 to vary its resistance value, thereby increasing or decreasing the energizing amount. The electrical signal T0 is corrected by the electrical signal T1 produced by the first auxiliary resistance 40. Consequently, the influence of heat generation of the processing part 7 on the intake temperature detection signal T can be eliminated. As a result, the accuracy of detection of the intake temperature can be improved.

Due to heat transfer from a part of the air flow measuring device 1 other than the high-temperature resistance 5 and the processing part 7 (mainly, the housing 4 or the secondary formation part 17), the second auxiliary resistance 41 varies its resistance value, thereby increasing or decreasing the energizing amount. The electrical signal T0 is corrected by the electrical signal T2 produced by the second auxiliary resistance 41.

Accordingly, when a temperature transient state where a temperature difference between the ambient temperature of the air flow measuring device 1 and the intake temperature is great is produced, an influence of the temperature transient state on the intake temperature detection signal T can be removed. As a consequence, the accuracy of detection of the intake temperature can be further improved.

For example, when the ambient temperature of the air flow measuring device 1 (i.e., temperature of the housing 4 and the secondary formation part 17) is increased by high-load operation such as uphill traveling, and then the operation moves into idling operation, there is produced a temperature transient state where the ambient temperature of the air flow measuring device 1 is higher than the intake temperature. Accordingly, a detection error indicating a value that is higher than the actual intake temperature is caused in the intake temperature detection signal T. When the ambient temperature of the air flow measuring device 1 is increased by the high-load operation, and then the operation moves into downhill traveling, the ambient temperature of the air flow measuring device 1 is promptly reduced by traveling wind, so that there is produced a temperature transient state where the ambient temperature of the air flow measuring device 1 is lower than the intake temperature. Accordingly, a detection error indicating a value that is lower than the actual intake temperature is caused in the intake temperature detection signal T.

For this reason, by correcting the electrical signal T0 using the electrical signal T2, the influence of the temperature transient state on the intake temperature detection signal T can be removed. As a consequence, the accuracy of detection of the intake temperature can be further improved.

Due to heat transfer from the intake air heated by the high-temperature resistance 5 in the second flow passage 9b, the third auxiliary resistance 42 varies its resistance value, thereby increasing or decreasing the energizing amount. The electrical signal T0 is corrected using the electrical signal T3 produced by the third auxiliary resistance 42. Consequently, the influence of the heat transfer from the heated intake air can be eliminated from the intake temperature detection signal T. As a result, the accuracy of detection of the intake temperature can be further improved.

In addition, the intake temperature detection signal T is outputted to the ECU 3 sequentially as a serial signal along with another signal such as the intake air amount detection signal Q. Accordingly, the number of terminals 15 can be reduced to downsize the connector 18.

Second Embodiment

Figure 8:
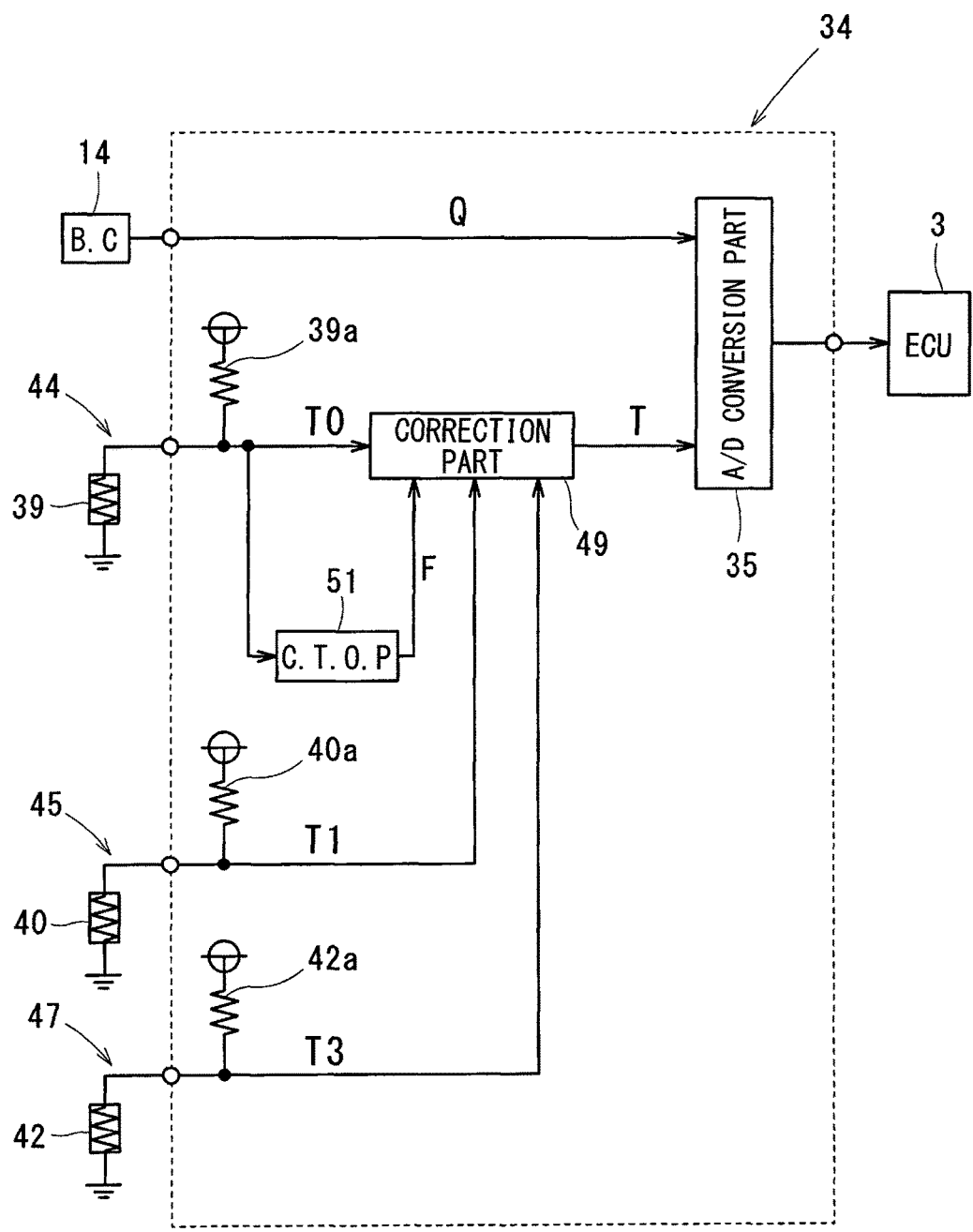
FIG. 8 is a block diagram illustrating a main feature of an air flow measuring device in accordance with a second embodiment.

As illustrated in FIG. 8, an air flow measuring device 1 of a second embodiment is not provided with the second auxiliary resistance 41, and includes a correction term operation part 51 which will be described hereinafter. The correction term operation part 51 is a function provided for a digital circuit 34, and calculates a correction term F in accordance with a pattern of a temporal change of an electrical signal T0 of a second low-temperature resistance 39. A correction part 49 corrects the electrical signal T0 through the use of electrical signals T1, T3 of first and third auxiliary resistances 40, 42 and the correction term F, for example, based on the following mathematical expression 2.

$$T = T0 + a \cdot T1 + F + c \cdot T3 + d \quad \text{[Mathematical expression 2]}$$

Various patterns of the temporal change of the electrical signal T0 are stored in accordance with a pattern of a temporal change of an operational state of the engine. A method of calculating the correction term F is stored for each pattern of the temporal change of the electrical signal T0.

For example, when the pattern corresponding to the above-described transition from uphill traveling to idling operation is recognized, the correction term operation part 51 calculates the correction term F as a negative numerical value so that the electrical signal T0 can be reduced at the correction part 49. When the pattern corresponding to the above-described transition from uphill traveling to downhill traveling is recognized, the correction term operation part 51 calculates the correction term F as a positive numerical value so that the electrical signal T0 can be increased at the correction part 49.

Accordingly, an intake temperature detection signal T can be corrected in accordance with the pattern of the temporal change of the electrical signal T0. As a result, the influence of the temperature transient state can be eliminated from the intake temperature detection signal T, and therefore a correction can be made for removing the influence of the temperature transient state without providing the second auxiliary resistance 41.

Modifications to the above embodiments will be described below. In the air flow measuring device 1 of the first embodiment, the pre-correction intake temperature detection signal T (electrical signal T0) is corrected by use of the electrical signals T1 to T3. In the air flow measuring device 1 of the second embodiment, the electrical signal T0 is corrected using the electrical signals T1, T3 and the correction term F. However, the mode of correction can be modified variously as needed. For example, the electrical signal T0 may be corrected only by the electrical signal T1, or the electrical signal T0 may directly serve as the intake temperature detection signal T without its correction. Although the second low-temperature resistance 39 is provided as a semiconducting film according to the air flow measuring device 1 of the embodiments, the second low-temperature resistance 39 may alternatively be provided as a metallic film.

In the air flow measuring device 1 of the embodiments, the intake temperature detection signal T is outputted to the ECU 3 sequentially as a serial signal along with the intake air amount detection signal Q. However, the mode of outputting the intake temperature detection signal T to the ECU 3 is not limited to such a mode. For example, the air flow measuring device 1 is provided with a function of detecting the humidity of intake air, and the intake temperature detection signal T may be outputted together with a signal indicating the humidity. Additionally, the intake temperature detection signal T may be outputted to the ECU 3 by a frequency signal instead of the serial signal. For example, the intake temperature detection signal T is converted into one of a period and a duty ratio of the frequency signal. Furthermore, a signal other than the intake temperature detection signal T (the intake air amount detection signal Q or the signal indicating the humidity) is converted into the other one of the period and the duty ratio, and they may be outputted to the ECU 3.

To sum up, the air flow measuring device 1 of the above embodiments may be described as follows.

An air flow measuring device 1 in the first aspect of the present disclosure is for producing an intake air amount detection signal Q and an intake temperature detection signal T which indicate a flow rate and a temperature of intake air drawn into an internal combustion engine, respectively. The air flow measuring device 1 includes a housing 4, a high-temperature resistance 5, a first low-temperature resistance 6, a second low-temperature resistance 39, a predetermined substrate 12, another bridge circuit 14, and a digital circuit 34. The housing 4 projects into an intake passage 2 through which the intake air flows, and includes an internal passage 9 which takes in a part of the intake air flowing through the intake passage 2 and through which the part of the intake air passes. The high-temperature resistance 5 is disposed in the internal passage 9 and has its energization controlled in accordance with the flow rate of intake air flowing through the internal passage 9 to increase or decrease an amount of heat generated. The first low-temperature resistance 6 is an element constituting a bridge circuit 10 which has its energization state changed according to the amount of heat generated by the high-temperature resistance 5. The first low-temperature resistance 6 varies its resistance value according to the temperature of intake air. The second low-temperature resistance 39 is an element, which is not incorporated into the bridge circuit 10 and varies its resistance value according to the temperature of intake air to increase or decrease an amount of energization. The second low-temperature resistance 39 is provided as a semiconducting or metallic film on the predetermined substrate 12. The another bridge circuit 14 produces the intake air amount detection signal Q by use of an electrical signal generated by operation of the high-temperature resistance 5 and the first low-temperature resistance 6. The digital circuit 34 uses an electrical signal T0 produced by the second low-temperature resistance 39 as the intake temperature detection signal T.

Accordingly, through detection of the one electrical signal T0 produced by the second low-temperature resistance 39, the intake temperature can be detected, and the complication of the circuit configuration and arithmetic processing related to the intake temperature detection can be reduced. Moreover, by providing the second low-temperature resistance 39 as a semiconducting or metallic film on the predetermined substrate 12, the structural complication can be decreased. Thus, in the air flow measuring device 1, the complication of the circuit configuration and arithmetic processing and the structural complication related to the detection of intake temperature can be reduced.

The air flow measuring device 1 in the second aspect of the present disclosure further includes a processing part 7, a first auxiliary resistance 40, and a correction part 49. The processing part 7 performs processing to produce the intake air amount detection signal Q. The first auxiliary resistance 40 is influenced by heat generation of the processing part 7 to vary its resistance value, thereby increasing or decreasing an amount of energization. The correction part 49 corrects the electrical signal T0 produced by the second low-temperature resistance 39 by an electrical signal T1 produced by the first auxiliary resistance 40. Consequently, the influence of heat generation of the processing part 7 on the intake temperature detection signal T can be eliminated. As a result, the accuracy of detection of the intake temperature can be improved.

The air flow measuring device 1 in the third aspect of the present disclosure further includes a processing part 7, a portion 4, 17, a second auxiliary resistance 41, and a correction part 49. The processing part 7 performs processing to produce the intake air amount detection signal Q. The portion 4, 17 excludes the high-temperature resistance 5 and the processing part 7. The second auxiliary resistance 41 varies its resistance value by heat transfer from the portion 4, 17, thereby increasing or decreasing an amount of energization. The correction part 49 corrects the electrical signal T0 produced by the second low-temperature resistance 39 by an electrical signal T2 produced by the second auxiliary resistance 41. Accordingly, when a temperature transient state where a temperature difference between the ambient temperature of the air flow measuring device 1 and the intake temperature is great is produced, an influence of the temperature transient state on the intake temperature detection signal T can be removed. As a consequence, the accuracy of detection of the intake temperature can be further improved.

For example, when the ambient temperature of the air flow measuring device 1 is increased by high-load operation such as uphill traveling, and then the operation moves into idling operation, there is produced a temperature transient state where the ambient temperature of the air flow measuring device 1 is higher than the intake temperature. Accordingly, a detection error indicating a value that is higher than the actual intake temperature is caused in the intake temperature detection signal T. When the ambient temperature of the air flow measuring device 1 is increased by the high-load operation, and then the operation moves into downhill traveling, the ambient temperature of the air flow measuring device 1 is promptly reduced by traveling wind, so that there is produced a temperature transient state where the ambient temperature of the air flow measuring device 1 is lower than the intake temperature. As a result, a detection error indicating a value that is lower than the actual intake temperature is caused in the intake temperature detection signal T.

For this reason, through correction of the electrical signal T0 from the second low-temperature resistance 39 by the electrical signal T2 from the second auxiliary resistance 41, the influence of the temperature transient state on the intake temperature detection signal T is removed. As a consequence, the accuracy of detection of the intake temperature can be further improved.

The air flow measuring device 1 in the fourth aspect of the present disclosure further includes a third auxiliary resistance 42 and a correction part 49. The third auxiliary resistance 42 varies its resistance value due to heat transfer from intake air heated by the high-temperature resistance 5 in the internal passage 9, thereby increasing or decreasing an amount of energization. The correction part 49 corrects the electrical signal T0 produced by the second low-temperature resistance 39 by an electrical signal T3 produced by the third auxiliary resistance 42. Consequently, the influence of the heat transfer from the heated intake air can be eliminated from the intake temperature detection signal T. As a result, the accuracy of detection of the intake temperature can be further improved.

The air flow measuring device 1 in the fifth aspect of the present disclosure further includes a correction part 49 that corrects the electrical signal T0 produced by the second low-temperature resistance 39 in accordance with a pattern of a temporal change of the electrical signal T0 of the second low-temperature resistance 39. Accordingly, the pattern of the temporal change of the electrical signal T0 from the second low-temperature resistance 39 is stored for each of various temperature transient states, and the electrical signal T0 of the second low-temperature resistance 39 is corrected using these patterns. As a consequence, the intake temperature detection signal T can be corrected. Thus, the influence of the temperature transient state can be eliminated from the intake temperature detection signal T, and therefore a correction can be made for removing the influence of the temperature transient state without providing the second auxiliary resistance 41.

In the sixth aspect of the present disclosure, the intake temperature detection signal T is outputted to an external device 3 as one of output signals including a signal other than the intake temperature detection signal T. Consequently, the intake temperature detection signal T and a signal other than the intake temperature detection signal T (e.g., intake air amount detection signal Q) can be outputted together in one signal as a serial signal (seventh aspect of the present disclosure) or a frequency signal (eighth aspect of the present disclosure). Thus, the number of terminals 15 can be reduced to downsize the connector 18.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device for producing an intake air amount detection signal and an intake temperature detection signal which indicate a flow rate and a temperature of intake air drawn into an internal combustion engine, respectively, the air flow measuring device comprising:
    a housing that projects into an intake passage through which the intake air flows and that includes an internal passage which takes in a part of intake air flowing through the intake passage and through which the part of intake air passes;
    a high-temperature resistance that is disposed in the internal passage and has its energization controlled in accordance with the flow rate of intake air flowing through the internal passage to increase or decrease an amount of heat generated;
    a first low-temperature resistance that is an element constituting a bridge circuit which has its energization state changed according to the amount of heat generated by the high-temperature resistance, wherein the first low-temperature resistance varies its resistance value according to the temperature of intake air;
    a second low-temperature resistance that is an element, which is not incorporated into the bridge circuit and varies its resistance value according to the temperature of intake air to increase or decrease an amount of energization;
    a predetermined substrate on which the second low-temperature resistance is provided as a semiconducting or metallic film;
    another bridge circuit that produces the intake air amount detection signal by use of an electrical signal generated by operation of the high-temperature resistance and the first low-temperature resistance; and
    a digital circuit that uses an electrical signal produced by the second low-temperature resistance as the intake temperature detection signal.

2. The air flow measuring device according to claim 1, further comprising:
    a processing part that performs processing to produce the intake air amount detection signal;
    a first auxiliary resistance that is influenced by heat generation of the processing part to vary its resistance value, thereby increasing or decreasing an amount of energization; and
    a correction part that corrects the electrical signal produced by the second low-temperature resistance by an electrical signal produced by the first auxiliary resistance.

3. The air flow measuring device according to claim 1, further comprising:
    a processing part that performs processing to produce the intake air amount detection signal;
    a portion that excludes the high-temperature resistance and the processing part;
    a second auxiliary resistance that varies its resistance value by heat transfer from the portion, thereby increasing or decreasing an amount of energization; and
    a correction part that corrects the electrical signal produced by the second low-temperature resistance by an electrical signal produced by the second auxiliary resistance.

4. The air flow measuring device according to claim 1, further comprising:
    a third auxiliary resistance that varies its resistance value due to heat transfer from intake air heated by the high-temperature resistance in the internal passage, thereby increasing or decreasing an amount of energization; and a correction part that corrects the electrical signal produced by the second low-temperature resistance by an electrical signal produced by the third auxiliary resistance.

5. The air flow measuring device according to claim 1, further comprising a correction part that corrects the electrical signal produced by the second low-temperature resistance in accordance with a pattern of a temporal change of the electrical signal of the second low-temperature resistance.

6. The air flow measuring device according to claim 1, wherein the intake temperature detection signal is outputted to an external device as one of output signals including a signal other than the intake temperature detection signal.

7. The air flow measuring device according to claim 6, wherein the intake temperature detection signal and the signal other than the intake temperature detection signal are sequentially transmitted as a serial signal to the external device, so that the output signals are outputted to the external device.

8. The air flow measuring device according to claim 6, wherein the output signals are outputted to the external device as a frequency signal, with the intake temperature detection signal converted into one of a period and a duty ratio of the frequency signal, and the signal other than the intake temperature detection signal converted into the other one of the period and the duty ratio of the frequency signal.

* * * * *